United States Patent
Mackie et al.

(10) Patent No.: US 11,754,432 B2
(45) Date of Patent: Sep. 12, 2023

(54) SYSTEM AND METHOD FOR DETECTING PROBLEMS WITHIN COMPOUND WATER METERS

(71) Applicant: Olea Networks, Inc., Bee Cave, TX (US)

(72) Inventors: David Mackie, Austin, TX (US); Stefan Grefen, Nierstein (DE); Corey James Boelter, Round Rock, TX (US)

(73) Assignee: Olea Networks, Inc., Bee Cave, TX (US)

( * ) Notice: Subject to any disclaimer, the term of this patent is extended or adjusted under 35 U.S.C. 154(b) by 68 days.

(21) Appl. No.: 17/154,410

(22) Filed: Jan. 21, 2021

(65) Prior Publication Data
US 2022/0228901 A1 Jul. 21, 2022

(51) Int. Cl.
*G01F 25/10* (2022.01)
*G01D 4/00* (2006.01)
(Continued)

(52) U.S. Cl.
CPC .............. *G01F 25/10* (2022.01); *G01D 4/004* (2013.01); *G01F 1/60* (2013.01); *G06Q 50/06* (2013.01)

(58) Field of Classification Search
CPC .. G01F 25/10; G01F 25/0084; G01F 25/0092; G01F 25/11; G01F 25/13;
(Continued)

(56) References Cited

U.S. PATENT DOCUMENTS

| 4,429,471 A * | 2/1984 | Goodstine | B01J 8/1818 |
| | | | 239/557 |
| 8,746,032 B1 * | 6/2014 | Feller | G01F 5/00 |
| | | | 73/1.35 |

(Continued)

FOREIGN PATENT DOCUMENTS

| JP | H067218688 A | * | 8/1995 |
| JP | 2001065527 A | * | 3/2001 |

OTHER PUBLICATIONS

Amazon, "Beduan Micro Water Turbine Generator Hydroelectric Power 1/2 24V Micro Hydro Generator Changeing Tool", Printed from Internet Oct. 12, 2020, 1 pg.

*Primary Examiner* — Daniel R Miller
*Assistant Examiner* — Eric Sebastian Von Wald
(74) *Attorney, Agent, or Firm* — Egan, Enders & Huston LLP.

(57) ABSTRACT

Embodiments of systems and methods are provided to monitor operation of a compound water meter comprising a low flow meter and a high flow meter. In the disclosed embodiments, a first sensor package is coupled to the low flow meter to generate a first set of sensor data for monitoring operation of the low flow meter, and a second sensor package is coupled to the high flow meter to generate a second set of sensor data for monitoring operation of the high flow meter. The first and second sensor packages may each include, e.g., an optical sensor, a magnetic sensor and a vibration sensor. In the disclosed embodiments, the first and second sets of sensor data are analyzed to detect various potential problems within the compound water meter, such as a register failure, a crossover failure, a measurement failure, a bypass open condition and/or an incorrect flow meter size.

21 Claims, 8 Drawing Sheets

(51) Int. Cl.
*G01F 1/60* (2006.01)
*G06Q 50/06* (2012.01)

(58) Field of Classification Search
CPC .......... G01F 25/20; G01F 25/24; G01F 25/00; G01F 1/60; G01F 1/00; G01F 1/56; G01F 1/58; G01F 1/696; G01F 1/6965; G01F 1/698; G01F 1/76; G01F 1/78; G01F 7/00; G01F 9/001; G01F 9/023; G01F 11/00; G01D 4/00; G01D 4/002; G01D 4/004; G01D 4/006; G01D 4/008; G06Q 50/06; G08B 21/0484; E03F 2005/068
See application file for complete search history.

(56) References Cited

U.S. PATENT DOCUMENTS

| | | | |
|---|---|---|---|
| 10,302,454 B2 * | 5/2019 | Mackie | G01F 1/60 |
| 10,408,647 B2 | 9/2019 | Mackie et al. | |
| 2009/0090418 A1 * | 4/2009 | Parris | G01D 11/245 |
| | | | 137/493 |
| 2010/0005903 A1 * | 1/2010 | Beavis | G05D 7/0617 |
| | | | 73/290 R |
| 2012/0036823 A1 * | 2/2012 | Furman | G01N 3/00 |
| | | | 73/49.3 |
| 2016/0061640 A1 * | 3/2016 | Joshi | G01F 15/18 |
| | | | 73/197 |
| 2016/0341593 A1 * | 11/2016 | Schweitzer | G01F 7/00 |

\* cited by examiner

SYSTEM AND METHOD FOR DETECTING PROBLEMS WITHIN COMPOUND WATER METERS

BACKGROUND OF THE INVENTION

Field of the Invention

In general, the present invention relates to systems and methods for the analysis of fluid flow and other sensor data in compound meters. In a preferred form, the system and methods hereof are depicted in the context of compound water meters that account for water flow from a utility infrastructure to a customer.

Description of the Relevant Art

Compound water meters are used where high water flow rates are often necessary, but at other times low flow rates are present. In both cases, it is important to measure the water flow through the meter. That is, a compound water meter should have the ability to measure over wide flow rate ranges including low flow sensitivity and high flow rate capacity. Compound water meters are typically used with commercial water customers such as schools, factories, apartment buildings, hotels, hospitals, office buildings and industrial users. It is important to measure the water flow to such customers over a wide range to accurately charge for water usage, which also promotes water conservation and saves the utility and customer money.

Presently, many efforts are underway to upgrade water meters typically used in municipal water supply systems with so called "smart meters." A smart meter is a digitally enabled flow meter, which presents the measured throughput and possibly other data in digital format, is capable of transmitting data by means of a network, and is enabled for communication and coordination of actions with a management system. A legacy flow meter, working on a purely mechanical basis, typically has an expected lifespan of 15 years or more. Many electronic components used in smart meters fall short of these lifetimes, more so if deployed outdoors in harsh climate conditions.

A legacy compound water meter does not have a digital interface, or if it has one, its capabilities do not satisfy the requirements for integration into a system for the management of smart meters. For instance, a compound water meter that functions on a purely mechanical basis, or a flow meter that has a digital interface but no capabilities for long range data transmission by means of a network, are regarded as legacy flow meters.

Legacy compound water meters frequently are old and costly to upgrade, and have defects that are hard to diagnose. For instance, in municipal water supply systems, up to 20% of water is assumed to be lost due to leaks in pipes. Pipe leaks are difficult and costly to find, and thus this often is not attempted. Another problem with legacy compound water meters is underreporting caused by wear or a premature failure of parts under adverse conditions. For instance, the turbine section of the meter may be affected by sediment build-up near the turbine or the occurrence of back pressure in the pipe, which may lead to gradual or sudden failures. In compound water meters, a low pressure or high pressure turbine failure will often go undetected with meter failure in the applicable range.

Another source for underreporting is intentional or unintentional diversion of water in the region of the compound water meter. Most compound water meters have bypass sections that allow for maintenance and also shut off valves of either the low flow or high flow meter portion of the compound water meter. An open bypass valve can lead to dramatic underreporting of water consumption and lost revenue for the water utility.

Both leaks in the vicinity of compound water meters and underreporting compound water meters are difficult to identify, particularly with legacy compound water meters. To determine either condition, one needs to essentially measure throughput in the region of the compound water meter before and after the location where the condition is suspected to occur. This typically is infeasible or very costly to do with legacy compound water meters.

See, U.S. Pat. No. 10,302,454, "Retrofit Device and Method of Retrofitting a Flow Meter" and U.S. Pat. No. 10,408,647 "Analysis of Pipe Systems with Sensor Devices", both of which are incorporated herein by reference.

SUMMARY OF THE INVENTION

The problems outlined above are addressed by one or more of the embodiments of the present invention. In a broad form, a system in accordance with the present invention comprises a compound water meter, a plurality of sensors and a processing device. The compound water meter generally includes a pipe system having a low flow section, a high flow section and a bypass section; a low flow meter for monitoring fluid flow through the low flow section; and a high flow meter for monitoring fluid flow through the high flow section. The plurality of sensors may be coupled at various points within the pipe system for generating sensor data pertaining to the compound water meter. The processing device is coupled to receive the sensor data from the plurality of sensors and is configured to execute program instructions to analyze the sensor data to detect problems within the compound water meter. The processing device may be a local device located near the compound water meter, or a remote device located away from the compound water meter. When a remote processing device is utilized, the compound water meter may further include a communications device to communicate the sensor data over a network to the remote processing device (e.g., a cloud computing device).

In some embodiments, the plurality of sensors may include a first sensor package coupled to the low flow meter to monitor operation of the low flow meter, and a second sensor package coupled to the high flow meter to monitor operation of the high flow meter. In one embodiment, the first and second sensor packages may each include an optical sensor, a magnetic sensor and a vibration sensor. The optical sensor may be coupled to generate an image of at least a portion of a meter display provided on the low flow meter or the high flow meter. The magnetic sensor may be coupled to generate a rotation count of a turbine included within the low flow meter or the high flow meter. The vibration sensor may be coupled to generate vibration signatures indicative of fluid flow through the low flow meter or the high flow meter. In such embodiments, the sensor data received by the processing device may include the image generated by the optical sensor, the rotation count generated by the magnetic sensor and the vibration signatures generated by the vibration sensor.

In some embodiments, the plurality of sensors may include at least one water pressure sensor, which is coupled to measure water pressure within the compound water meter. In one example, the at least one water pressure sensor may be arranged within a test port located at or near an input to the compound water meter to measure the incoming water pressure. In another example, one or more additional water pressure sensors may be arranged within the low flow section, the high flow section and/or the bypass section to measure the water pressure within those sections. In such embodiments, the sensor data received by the processing device may further include the water pressure measured by the water pressure(s).

In some embodiments, the processing device may execute the program instructions to analyze the sensor data received from one or more sensors included within the first sensor package and/or the second sensor package to detect a register failure, a crossover failure, a measurement failure, a bypass open condition or an incorrect flow meter size. In some embodiments, the processing device may execute the program instructions to combine the sensor data received from the at least one water pressure sensor with the sensor data received from the first sensor package or the second sensor package to detect leaks within the compound water meter and/or to detect fraud (e.g., from an open bypass valve to bypass the water meter).

In some embodiments, the plurality of sensors may include one or more additional sensors. In one embodiment, for example, the plurality of sensors may include a temperature sensor, which is coupled to measure a temperature of the fluid flow, or an ambient temperature surrounding compound water meter. In such an embodiment, the sensor data received by the processing device may further include the temperature measured by the temperature sensor. In another embodiment, the plurality of sensors may include a water quality sensor, which is coupled to measure one or more chemical properties of the fluid flow within the compound water meter. In such an embodiment, the sensor data received by the processing device may further include the chemical properties measured by the water quality sensor. In yet another embodiment the plurality of sensors may include a leak detection sensor, which is indirectly coupled to the compound water meter for detecting water presence outside of the compound water meter. In such an embodiment, the sensor data received by the processing device may further include water detection readings obtained by the leak detection sensor.

In some embodiments, the system may further include a power source or a power generator, which is configured to supply electrical power to one or more components of the system. In one embodiment, a hydro-electric generator may be coupled to the compound water meter and configured to convert energy of the fluid flow through the compound water meter into electric energy, which is supplied to the processing device and/or one or more of the plurality of sensors. Other power sources and/or power generators may also be used to supply electrical power to one or more of the system components.

According to another embodiment, a method is provided herein to detect problems within a compound water meter. In general, the method may include generating a first set of sensor data to monitor operation of the low flow meter over a time period, generating a second set of sensor data to monitor operation of the high flow meter over the time period, and analyzing the first set of sensor data and the second set of sensor data to detect problems within the compound water meter. In some embodiments, the first set of sensor data may be generated by a first sensor package coupled to the low flow meter, and the second set of sensor data may be generated by a second sensor package coupled to the high flow meter, as set forth above.

In some embodiments, the first set of sensor data may be generated by generating, over the time period, a series of images of a meter display provided on the low flow meter, wherein each image captures a cumulative throughput of the fluid flow through the low flow meter at one point in time. Likewise, the second set of sensor data may be generated by generating, over the time period, a series of images of a meter display provided on the high flow meter, wherein each image captures a cumulative throughput of the fluid flow through the high flow meter at one point in the time period.

In such embodiments, the first set of sensor data and the second set of sensor data may each be analyzed by extracting the cumulative throughput of the fluid flow from each image of the series of images to generate digital readings of the cumulative throughput over the time period, and using the digital readings of the cumulative throughput to generate flow rate measurements over the time period. In some cases, a register failure may be detected during the analysis step, if the digital readings of the cumulative throughput stay the same or decrease over the time period. In other cases, an incorrectly sized flow meter may be detected during the analysis step, if a specified percentage of the flow rate measurements occur below an optimal flow rate specified by a manufacturer. In yet other cases, a crossover failure may be detected during the analysis step, if: (a) the flow rate measurements pertaining to the fluid flow through the low flow meter over the time period are less than a crossover range specified by a manufacture and (b) one or more of the flow rate measurements pertaining to the fluid flow through the high flow meter over the time period are greater than zero.

In other embodiments, the first set of sensor data and the second set of sensor data may each be generated by: (a) generating, over the time period, a series of images of a meter display provided on the low flow meter or the high flow meter, wherein each image captures a cumulative throughput of the fluid flow through the low flow meter or the high flow meter at one point in time; (b) generating, over the time period, a rotation count of a turbine included within the low flow meter or the high flow meter; and (c) generating, over the time period, vibration signatures indicative of fluid flow through the low flow meter or the high flow meter.

In such embodiments, the first set of sensor data and the second set of sensor data may each be analyzed by: (a) extracting the cumulative throughput from each image of the series of images to generate digital readings of the cumulative throughput over the time period; (b) using the digital readings of the cumulative throughput to generate flow rate measurements over the time period; (c) comparing the flow rate measurements, the rotation count and the vibration signatures generated over the time period; and (d) detecting a measurement failure if the flow rate measurements or the rotation count do not correlate with the vibration signatures.

In some embodiments, the method disclosed herein may also include generating a third set of sensor data to measure water pressure within the compound water meter. In one example, the third set of sensor data may be generated by an additional sensor package, which is arranged within a test port located at or near an input to the compound water meter to measure the incoming water pressure. In another example, the third set of sensor data may be generated by one or more additional sensor packages, which are arranged within the low flow section, the high flow section and/or the bypass section to measure the water pressure within those sections. In such embodiments, the method may further include combining the third set of sensor data with the first set of sensor data or the second set of sensor data to detect leaks within the compound water meter and/or to detect fraud.

BRIEF DESCRIPTION OF THE DRAWINGS

Other objects and advantages of the invention will become apparent upon reading the following detailed description and upon reference to the accompanying drawings.

DETAILED DESCRIPTION OF THE PREFERRED EMBODIMENTS

A compound water meter typically records the cumulative throughput (e.g., flow volume units) that pass from the water utility to the customer. The compound water meter accommodates both low flow and high flow conditions by including a low flow section having a low flow meter and a high flow section having a high flow meter. Unlike conventional compound water meters, the compound water meter described herein contains a plurality of sensors and/or other instrumentation to measure and digitally record cumulative throughput, water flow rates and water pressure at various points within the compound water meter. Additionally, the compound water meter hereof may include a variety of other sensors to record additional data, such as but not limited to, vibration signals, water quality (e.g., pH, toxicity and/or other chemical properties of the water), ambient temperature and/or water temperature, and water presence outside of the meter and/or leak detection. As described in more detail below, the data obtained from one or more of the sensors described herein can be analyzed by a processing device to monitor water consumption and detect problems within the compound water meter, which would not have been detected through monitoring of water consumption alone.

Figure 1:
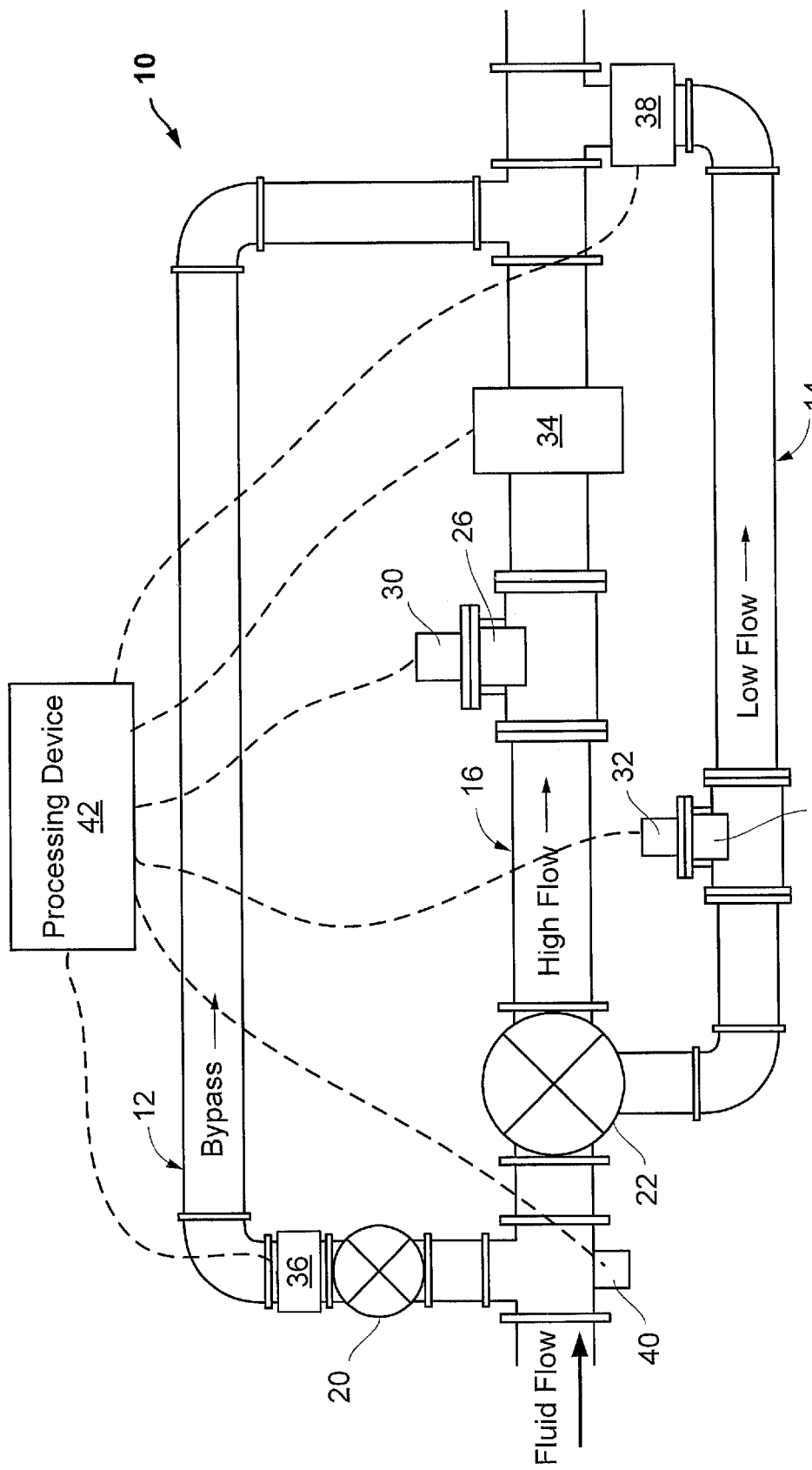
FIG. 1 is a functional diagram illustrating one embodiment of a compound water meter in accordance with the present techniques.

FIG. 1 illustrates one embodiment of a compound water meter 10 in accordance with the present techniques. As shown in FIG. 1, compound water meter 10 is illustrated as having a pipe system that includes a bypass section 12, a low flow section 14 and a high flow section 16. The bypass section 12 is activated/deactivated by operation of a bypass valve 20. Similarly, valve 22 is positioned at the junction of the high flow and low flow sections 14/16. Valve 22 is pressure operated to direct water into the low flow section 14 until pressure at the valve 22 reaches a certain level. Once the pressure at the valve 22 reaches the certain level, water is diverted into the high flow section 16. Optionally, the valve 22 can also have a manual override function to direct water flow specifically to either the high flow section 16 or the low flow section 14.

In the embodiment shown in FIG. 1, flow meters 24 and 26 are provided within the low flow section 14 and the high flow section 16, respectively, for monitoring the fluid flow through those sections. In one embodiment, flow meters 24, 26 may be implemented as turbine flow meters. As known in the art and described in more detail below, a turbine flow meter has a turbine section that rotates with fluid flow and drives the reading on the register provided on the meter face as water flows through the meter. It is recognized, however, flow meters 24, 26 are not strictly limited to turbine flow meters and may be implemented differently, in other embodiments. Instead of a turbine, for example, flow meters 24, 26 may include a nutating disk or floating ball to capture and record fluid flow.

As known in the art, a turbine flow meter measures the cumulative throughput of fluid flow in a pipe by means of the rotation of a turbine that is immersed in the fluid. The rotation speed of the turbine varies with the speed of the fluid flow, and the rotation count per time unit is translated into a flow volume for that time unit. A turbine flow meter typically displays the cumulative throughput (e.g., flow volume units) that passed through the pipe since installation of the flow meter, or since its last reset. It also may display the rate of throughput (e.g., the flow rate), which is equivalent to the first derivative of the function that models the cumulative throughput.

A turbine flow meter typically consists of two disjoint components: an external casing component comprising a turbine pickup and gearbox, and an internal component that is integrated into the pipe. The turbine pickup is an apparatus that provides for the translation of the rotation movement of the turbine into a signal that can be observed externally to the component that is integrated into the pipe. The transmitted signal typically is the strength of a magnetic field, which is used as a power source for a measuring device or observed by a measuring device. In a turbine flow meter that functions partially or entirely mechanically, the magnetic field generated by the turbine is used to power the gearbox situated inside the casing component. Power transmission occurs by means of magnets placed close to the turbine pickup and the gearbox. The gearbox translates rotational movements of the magnets into movements of a digit display (or register) provided on the meter face.

The meter face (or meter display) of the turbine flow meter typically has a transparent cover (e.g., glass or acrylic glass) and contains one or more elements, such as a digit display (or register) showing the accumulated fluid flow volume in a numeric format, and possibly further elements showing other measurements (e.g., the flow rate, water pressure, etc.) and/or indicators (e.g., a backflow indicator). In a turbine flow meter that functions entirely on a mechanical basis, the gearbox translates rotational movements of the magnet in the casing component into movements of a mechanically driven digit display via a magnetic coupling. If the turbine flow meter has electronic components, the digit display may be an LED or LCD display. In some embodiments, a turbine flow meter with electronic components may not contain a gearbox, but may translate the signal of the turbine pickup by means of magnetic sensors to obtain the rotation speed of the turbine.

In some embodiments, a flow meter with electronic control elements may be capable of storing a history of measurement data, and may have a digital interface to retrieve measurement data or state information about the flow meter. Such a flow meter may have capabilities for communication and data transmission. For instance, data transmission may be provided via a radio frequency (RF), Universal Serial Bus (USB), ZigBee, Bluetooth, or Bluetooth low energy (BLE) device, listening to signals, and in response may transmit a history of measurement data that have been recorded and stored. One example of a flow meter with such capabilities is described in U.S. Pat. No. 10,302,454.

The compound water meter 10 shown in FIG. 1 depicts a configuration that may be used in a meter pit disposed between the utility pipe system and a commercial user—left to right in FIG. 1. Typically, water flows from the utility pipe system through valve 22 into the low flow section 14 to the commercial user. At some point, higher water pressure may cause valve 22 to begin to open, allowing water to flow partially through the low flow section 14 and partially through the high flow section 16. As water pressure increases, the valve 22 opens more fully, allowing more water flow through the high flow section 16. For maintenance purposes, the bypass section 12 and bypass valve is included within the compound water meter 10, where operation of the bypass valve 20 permits both the low flow and high flow meters 24, 26 to be bypassed with water flowing directly to the commercial user.

As water flows through the low flow section 14 and the high flow section 16, the flow meters 24, 26 record various parameters of the fluid flow, such as for example, cumulative throughput (e.g., flow volume units), rate of throughput (e.g., flow rate), etc. In the compound water meter 10 shown in FIG. 1, sensor packages 30, 32 are included within, or coupled to, flow meters 24, 26 to record various parameters concerning operation of the flow meters 24, 26. Additional sensor packages may also be included to determine the water pressure at various points within the compound water meter 10 and/or to record other environmental data.

Each sensor package 30, 32 may generally include a number of sensors. In one embodiment, each sensor package 30, 32 preferably includes an optical sensor, a magnetic sensor, and a vibration sensor. As described in more detail below, the optical sensor reads the register on the meter display to obtain a digital reading of one or more measurements and/or indicators provided thereon. For example, the optical sensor may be used to obtain a digital reading of the cumulative throughput (e.g., flow volume units) that passes from the water utility to the customer and/or the rate of throughput (e.g., the flow rate). The magnetic sensor (e.g., a hall effect sensor) directly measures movement of the meter turbine, which indicates turbine operation and indirect measurement of the meter quantity. The vibration sensor is typically an acoustic or MEMS sensor, which senses vibration in the pipes indicative of water movement in the pipes.

As noted above, additional sensor packages may be included within the compound water meter 10 to determine water pressure at various points within the compound water meter 10 and/or to record other environmental data. In the embodiment shown in FIG. 1, sensor packages 34, 36, 38 are coupled to the high flow section 16, the bypass section 12 and the low flow section 14, respectively. Each sensor package 34, 36, 38 includes a pressure sensor for measuring the water pressure in the respective section. In addition or alternatively, other sensors can be included within sensor packages 34, 36, 38, such as sensors to record further environmental data, e.g., vibration signals, intra-pipe pressure, chemical properties of the water, air humidity and/or ambient temperature. In other embodiments, sensor packages 34, 36, 38 may be omitted and an additional sensor package (containing at least a pressure sensor) may be arranged within a test port located at or near an input to the compound water meter to measure the incoming water pressure.

In some embodiments, an environmental sensor package 40 may be coupled at the junction between the bypass section 12 and the high and low flow sections 14, 16, as shown in FIG. 1. The environmental sensor package 40 may include, for example, a chemical sensor to record temperature, acidity (pH), lead, or quantity of an additive. Although a single environmental sensor package 40 is shown in FIG. 1, additional environmental sensor packages can be added based on need and design choice.

The sensor data provided by sensor packages 30, 32, 34, 36, 38 and 40 is preferably recorded and time stamped, so that the sensor data can be analyzed to monitor water consumption and detect possible problems with the compound water meter 10. In some embodiments, the sensor data may be available in real time for real time data analysis. Alternatively, the sensor data may be recorded and analyzed offline at a later date. FIGS. 4-6 provide various examples of how the sensor data obtained from one or more of the sensor packages 30, 32, 34, 36, 38 and 40 may be analyzed to detect problems within the compound water meter 10, which would not have been detected through monitoring of water consumption alone.

Figure 2:
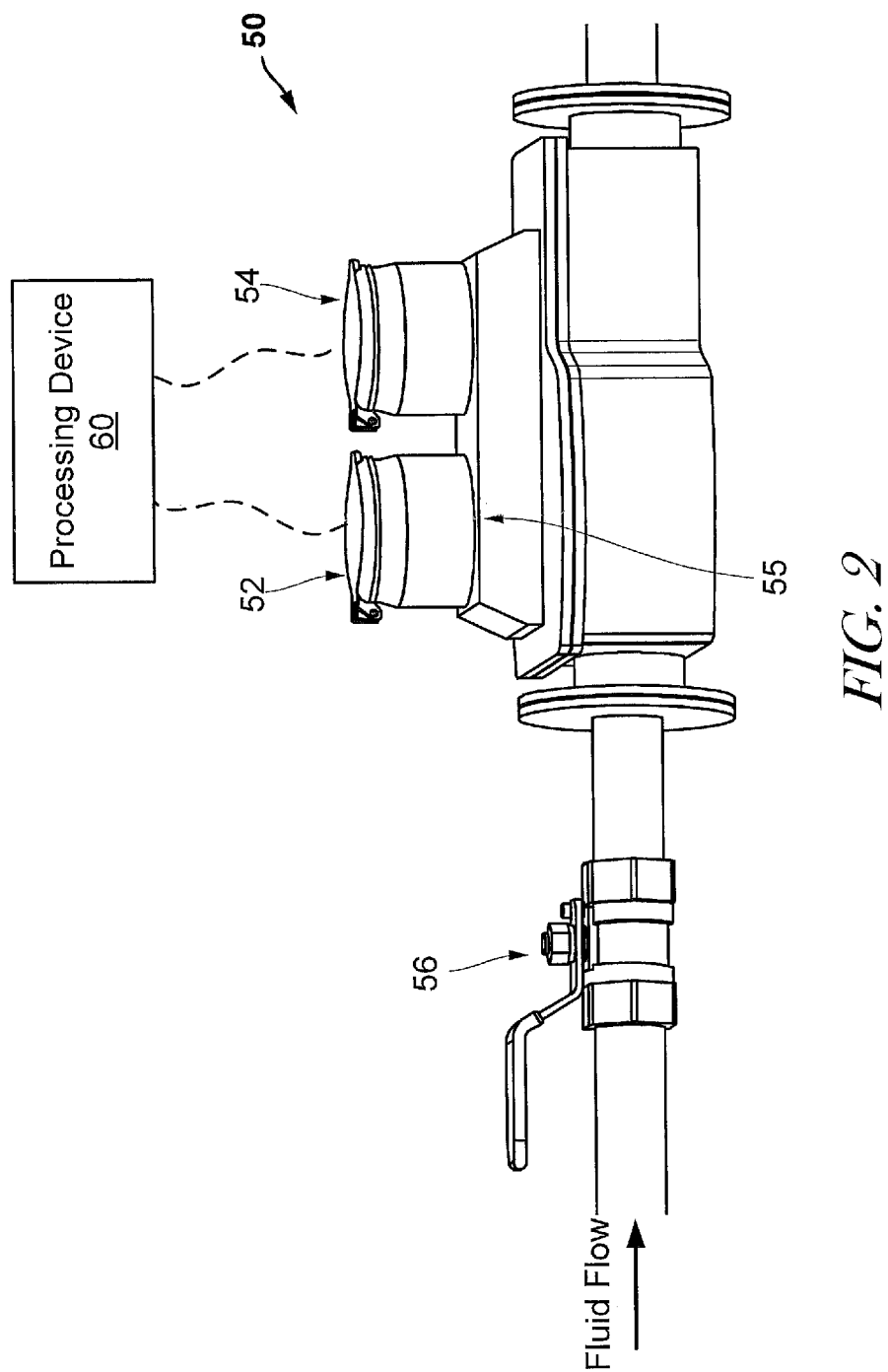
FIG. 2 is a perspective view illustrating another embodiment of a compound water meter in accordance with the present techniques.

Another embodiment of a compound water meter 50 is illustrated in FIG. 2. In comparison to the compound water meter 10 shown in FIG. 1, the low flow and high flow sections are internal to compound water meter 50, and thus, are not shown in FIG. 2. Similar to the previous embodiment, the compound water meter 50 includes a low flow meter 52 and a high flow meter 54 for measuring various parameters of fluid flow (e.g., cumulative throughput and/or flow rate) through the low flow and high flow sections, respectively. As shown in FIG. 2, the low flow and high flow meters 52, 54 may be mounted on, or otherwise coupled to, a meter display 55. As noted above, meter display 55 may have a transparent cover (e.g., glass or acrylic) and contain a digit display (e.g., analog or digital) showing the cumulative throughput in numeric format, and possibly further elements showing other measurements (e.g., the flow rate) and/or indicators (such as, a backflow indicator).

The low flow and high flow meters 52, 54 may also include or be coupled to sensor packages, similar to the embodiment shown in FIG. 1. Each sensor package (not shown) may contain a number of sensors to measure operational parameters of the flow meters 52, 54. In some embodiments, the sensor packages may contain, for example, an optical sensor, a magnetic sensor, and a vibration sensor. Other types of sensors may additionally or alternatively be included, such as sensors to record further environmental data, e.g., vibration signals, intra-pipe pressure, chemical properties of the water, air humidity and/or ambient temperature.

The compound water meter 50 shown in FIG. 2 may also include a shutoff valve 56 and a pressure sensor package (not shown). The shutoff valve 56 may be manually activated to shut off water flow to the compound water meter 50, thus enabling maintenance operations to be performed. If included, the pressure sensor package may provide additional information concerning the operation of the compound water meter 50, such as the incoming and/or outgoing water pressure.

Figure 3:
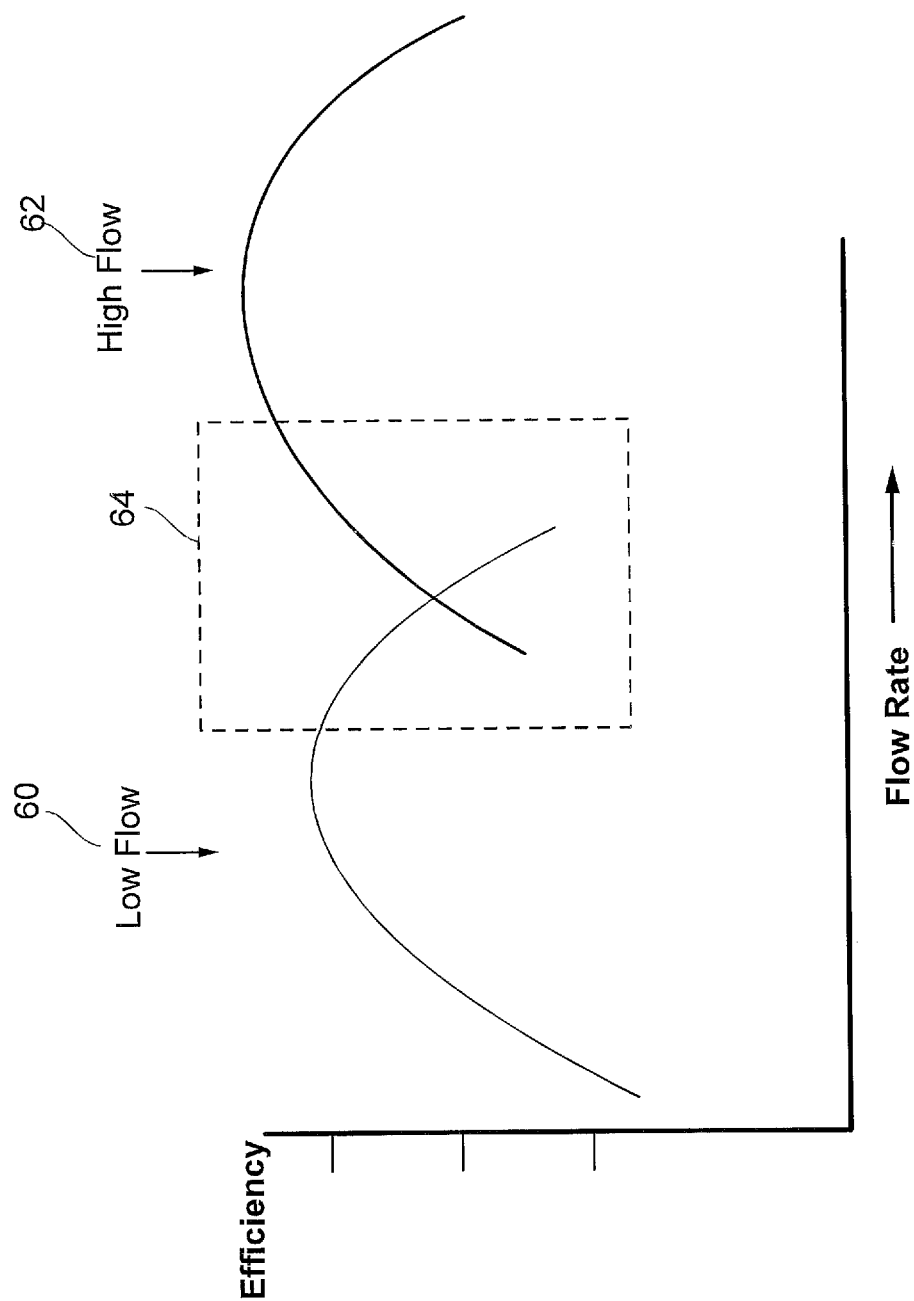
FIG. 3 is a graph showing efficiency versus flow rate of water through a compound water meter.

FIG. 3 is a graph of water flow through a compound water meter, such as the compound water meters 10 and 50 of FIGS. 1 and 2. The low flow rate graph 60, for example, illustrates water flow through the low flow section (e.g., low flow section 14 of FIG. 1), while the high flow rate graph 62 plots water flow through the high flow section (e.g., high flow section 16 of FIG. 1) of the compound water meter. The crossover region 64 between the low flow rate graph 60 and the high flow rate graph 62 shows how the valve (e.g., valve 22 of FIG. 1) located at the junction of the high flow and low flow sections begins to allow simultaneous flow through both the low flow and high flow sections.

In FIG. 3, it should be understood that the low flow rates 60 and high flow rates 62 are independently measured. Therefore, analysis of the flow rates 60 and 62 can be indicative of the proper functioning of the compound water meter. In addition, the crossover region 64 is of special interest. Most compound water meter manufacturers publish the specifications where the crossover region 64 should occur. Substantial deviation from the manufacturer's published specifications may indicate a problem in the system, which can lead to over- or underreporting of water usage and significant financial impact. For example, a backflow of water might drive the register reading backwards, but the associated vibration sensor would indicate water was flowing. In another example, the register might stop moving, perhaps because of a turbine failure, but the vibration sensor would record operation while the magnetic sensor is not operating. Another problem is the "nutating disk" where the turbine wheel is impeded which has little effect at low flow but significant effect at high flow.

The sensors included within the compound water meter 10/50 can help trouble shoot problems with the compound water meter. For example, the optical sensor included within the sensor packages 30, 32 can be used to obtain a digital reading of the cumulative throughput (and/or flow rate) from the flow meters 24, 26, which may be analyzed to detect problems. The graph shown in FIG. 3 illustrates proper functioning of a compound water meter, in that fluid flows through: (a) the low flow section 14 at lower flow rates, (b) the low flow section 14 and the high flow section 16 at flow rates falling within the crossover region 64, and (c) the high flow section 16 at higher flow rates. If the graph of FIG. 3, instead, showed relatively little fluid flow at lower flow rates, and significantly greater fluid flow beginning at the cross over region 64 in the high flow region, a failure or bypass of the low flow section 14 may be detected. This could be caused by an intentional operation of valve 22 to eliminate the low flow section 14, a failure of the valve 22, or a failure of the flow meter 24. It might also be indicative of a leak in the low flow section 14 prior to (or at) the flow meter 24. Having water flow only through the high flow section 16 can be problematic for a number of reasons, including the fact that the high flow water meter 26 typically does not read accurately, if at all, low flow water through the meter.

Legacy flow meters fail to accurately report fluid measurement data for a variety of reasons. For example, a legacy flow meter may underreport fluid flow due to incorrect sizing of the flow meter, leaks within the pipes, tamper attempts, or mechanical failures of parts within the flow meter or valves within the compound water meter. More specifically, one or more of the following failure conditions may cause a legacy flow meter to underreport fluid flow:

Register failures: The digit display (analog or digital) provided on the meter display may fail as a result of wear or as consequence of backpressure. Backpressure in a pipe is a condition causes the fluid flow direction to reverse, which leads to underreporting of accumulated fluid flow on the digit display. In a flow meter with a digital interface, a failure of electronic components or batteries may also cause an incorrect display of the accumulated fluid flow.

Measurement failures: This failure corresponds to the Unitized Measuring Element (e.g., the turbine, nutating disk or floating ball) used to capture the flow measurements for the flow meter. For example, debris or build-up of sediment, such as calcium or salt, may cause damage to the turbine of a flow meter. Backpressure may also put stress on mechanical parts of a flow meter, leading to sudden or gradual failures. For example, backpressure may cause gears in the gearbox to slip or break, causing a transmission loss between the turbine and the digit display. In addition, misalignment or deformation of components belonging to the magnetic coupling may cause an incorrect transmission of the rotation speed of the turbine to the external component.

Crossover failures: This failure corresponds to the mechanism that allows fluid flow to transition from the low flow section to the high flow section and vice versa. In the compound water meter 10 shown in FIG. 1, for example, a crossover failure may occur if valve 22 failed to transition from the low flow section 14 to the high flow section 16 (or vice versa) at the fluid flow rate specified by the manufacture (e.g., in gallons per minute, gpm).

Bypass open condition: Bypass open conditions may lead to underreporting when the bypass valve is opened during times when maintenance is not being performed on the compound water meter. In the compound water meter 10 shown in FIG. 1, for example, a customer may attempt to obtain free water by opening the bypass valve 20, which redirects water flow through the bypass section 12 and bypasses the flow meters 24, 26 in the low flow and high flow sections 14, 16. In another example, a customer may block the magnetic coupling with a magnet to reduce the rotation count transmitted to the digit display. This may also cause damage to the turbine or magnetic transmission.

Incorrect sizing: Incorrectly sized flow meters (both oversized and undersized) may not accurately measure fluid flow, leading to underreporting of fluid flow.

Pressure issues: Pressure issues within the pipe system of the legacy flow meter, including pressures over an upper threshold and under a lower threshold, may lead to underreporting of fluid flow.

Temperature issues: Ambient and/or water temperatures that are too hot or too cold may cause water leaks and/or pipe bursts, which may lead to underreporting of fluid flow.

Water quality issues: Corrosion in the pipes, minerals in the water and/or other public health concerns may cause pH imbalances and/or toxicity in the water. In other cases, the water flowing through the legacy meter may not purified, may be contaminated or may contain an incorrect imbalance of other chemical properties.

Water presence outside of the meter: This failure occurs when leaks within pipes cause fluid flow outside of the ecosystem of the legacy flow meter.

In order to determine if a legacy flow meter is accurately reporting fluid measurement data, a technician would need to either remove the flow meter from its installation site for testing in a laboratory, or insert measurement devices before and after the flow meter into the pipe where it is installed. Both methods are labor intensive and require a temporary outage. They are economic to do only if one knows with high confidence that the rate of underreporting for a given flow meter lies above a certain threshold. This is often difficult to determine. For instance, if a legacy flow meter in a municipal water utility starts reporting lower water usage than before, this may be due to a defect developing gradually over time, or may be due to a customer's increased awareness for water savings. Also, a pipe infrastructure tends to develop numerous small leaks over time, as it ages. While finding these leaks is a task of separate importance, such leaks further complicate the identification of flow meters for which an estimate of underreporting can be made with high confidence. Water utility companies assume revenue losses due to underreporting meters to be in a double digits percentage range. Yet, the cost typically associated with identifying underreporting flow meters is high.

To overcome the disadvantages noted above, the present disclosure provides a variety of sensors within a compound water meter (such as, but not limited to, compound water meter 10, 50 or 80) to obtain sensor data, which can be analyzed (either off-line or in real-time) to monitor water consumption and detect problems that may occur within the compound water meter. As set forth in more detail below, the sensor data obtained from one or more of the sensors provided herein may be analyzed to detect various failures and other problems that may lead to underreporting of fluid measurement data, such as register failures, measurement failures, crossover failures, bypass open conditions, and incorrect sizing of flow meters. In some embodiments, the sensor data obtained from the one or more sensors provided herein may also be used to detect water pressure issues, temperature issues, water quality issues and leaks within the pipes that enable water to flow outside of the compound water meter.

In the present disclosure, sensor packages 30, 32 are included within compound water meter 10 for monitoring operation of the flow meters 24, 26. As noted above, each sensor package 30, 32 may include an optical sensor, a magnetic sensor, and a vibration sensor, but may also include other types of sensors. In some embodiments, additional sensor packages (such as sensor packages 34, 36, 38 and 40) may be included within the compound water meter 10 for monitoring the water pressure within the bypass section 12, the low flow section 14, and the high flow section 16 and/or for monitoring other types of environmental data within the compound water meter 10. Although described below in the context of compound water meter 10, similar sensors or sensor packages may be provided within compound water meter 50, or another compound water meter design, to obtain similar sensor data.

The optical sensor reads the digit display (i.e., the register) on the meter display to obtain a digital reading of one or more measurements and/or indicators provided thereon. In some embodiments, the optical sensor may include one or more cameras, which are configured to generate photographic images or videos of the meter display, or sections or elements of the meter display. Information about the state of the meter display is extracted from the images or videos using pattern recognition techniques. For instance, optical character recognition (OCR) may be used to extract a numeric representation of the cumulative throughput (i.e., the accumulated water consumption that passes from the water utility to the customer) from an image taken of the digit display provided on the meter display. Pattern recognition techniques may also be used to extract other measurements (e.g., flow rate, water pressure) and/or indicators (e.g., a backflow indicator) provided on the meter display.

The magnetic sensor may be used to directly measure movement of the turbine, which indicates turbine operation and indirect measurement of the cumulative throughput. In some embodiments, two or more magnetic sensors may be located in proximity of the magnetic coupling provided within the flow meter 24, 26 to detect movement of the rotating magnets. The signals recorded by the two magnetic sensors can be used to provide a rotation counter for the turbine, and may further be used to detect misalignment of the magnetic coupling, gear slippage or blocking, and attempts to tamper with the flow meter by attaching magnets nears the magnetic coupling. In some embodiments, a hall effect sensor may be used to implement the magnetic sensor (s).

The vibration sensor may be used to sense vibrations in the low flow and high flow meters 24, 26 that result from water movement or fluid flow through the flow meters. As such, the vibration sensors included within the sensor packages 30, 32 may be used to detect the presence of fluid flow (or flow events) within the flow meters 24, 26. In some embodiments, an acoustic sensor or MEMS sensor may be used to implement the vibration sensors included within the sensor packages 30, 32.

The vibration sensors included within the sensor packages 30, 32 (and possibly other locations with the pipe system) may sense vibrations by capturing vibration signatures. A vibration signature is a characteristic set of frequencies that is observable by a sensor attached to an object, in response to mechanical movements of the latter. For instance, water flow in a pipe generates movements of the pipe, which is characterized by a set of frequencies that can be observed by a vibration sensor. Depending on external conditions, such as water content in the surrounding soil, the vibration signature generated in response to mechanical movement of the pipe may vary. A range of vibration signatures is understood to be a set of vibration signatures, each of which may be possibly generated in response to an event that causes mechanical movement for a given object. For instance, a range of vibration signatures is associated with water flow in a pipe, and the specific observed frequency pattern determined, among others, by the material of the pipe, its length and geometric shape. See e.g., U.S. Pat. No. 10,302,454.

The sensor data obtained from one or more of the sensor packages described herein may be analyzed by a processing device to monitor water consumption and detect problems, which may occur within a compound water meter. In the embodiment shown in FIG. 1, processing device 42 is communicatively coupled to sensor packages 30, 32, 34, 36, 38 and 40 for receiving the sensor data obtained thereby. In the embodiment shown in FIG. 2, processing device 60 is communicatively coupled to sensor packages included within, or coupled to, the low flow and high flow meters 52, 54 for receiving sensor data. Processing devices 42, 60 may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.).

The processing devices 42, 60 shown in FIGS. 1 and 2 may be coupled for receiving the sensor data via a wired or wireless connection, and may be local devices located near the compound water meter 10, 50 (e.g., within the meter pit), or may be remote devices located away from the compound water meter 10, 50. According to one embodiment, processing devices 42, 60 may be implemented as remote processing devices (e.g., within a cloud-based computer or server). When a remote processing device is utilized, the compound water meter 10, 50 may further include a communications device, which is coupled for receiving sensor data from the sensor packages and configured to communicate the sensor data to the remote processing device via a network (such as the Internet). The communications device may be configured to transmit the sensor data to the remote processing device using a wide variety of communication standards, protocols and/or technologies, including but not limited to, radio frequency (RF) and cellular communication standards, IEEE 802.11 (Wi-Fi), IEEE 802.15.1 (Bluetooth or BLE), and IEEE 802.15.4 (ZigBee).

The sensor data received by the processing devices 42, 60 may be analyzed in real-time, or may be stored and analyzed later. In particular, processing devices 42, 60 may execute program instructions to analyze the sensor data received from the sensor packages. As noted below, the sensor data may be analyzed to monitor water consumption and detect potential problems within the compound water meter, such as register failures, measurement failures, crossover failures, bypass open conditions, and incorrect sizing of flow meters.

In some embodiments, sensor data from only one of the sensors may be analyzed by the processing device 42, 60 to monitor water consumption and detect potential problems within the compound water meter. For example, the optical sensor included within sensor packages 30, 32 may be used to obtain a series of photographic images of the meter display over a period of time, and pattern recognition techniques (such as OCR) may be used to extract information from the photographic images such as, e.g., the cumulative throughput or flow rate through the flow meters 24, 26. If flow rate is not displayed on the meter display, the cumulative throughput may be extracted from the series of photographic images and further analyzed to determine or calculate corresponding flow rate measurements over the period of time. In some cases, a register failure may be detected by processing devices 42, 60 if the cumulative throughput extracted from the series of photographic images stays the same (indicating a failure of electronic components or batteries) or decreases over time (due to backpressure in the pipe). In other cases, an incorrectly sized flow meter may be detected by processing devices 42, 60 if a specified percentage of the flow rate measurements occurred below an optimal flow rate specified by a manufacturer of the flow meter.

Figure 4A:
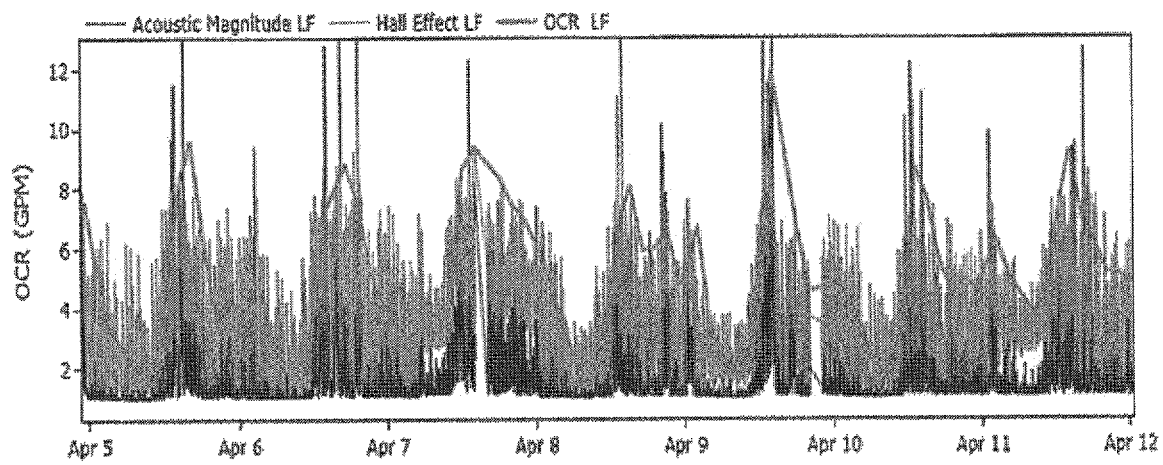
FIGS. 4A-4C are graphs illustrating how the sensor data described herein may be analyzed to detect a crossover failure within a compound water meter.
Figure 4B:
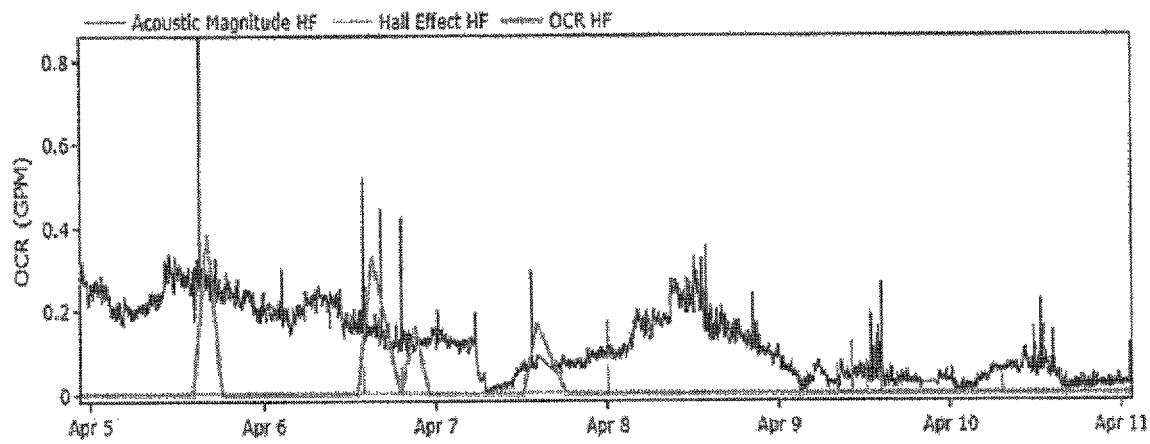
Figure 5A:
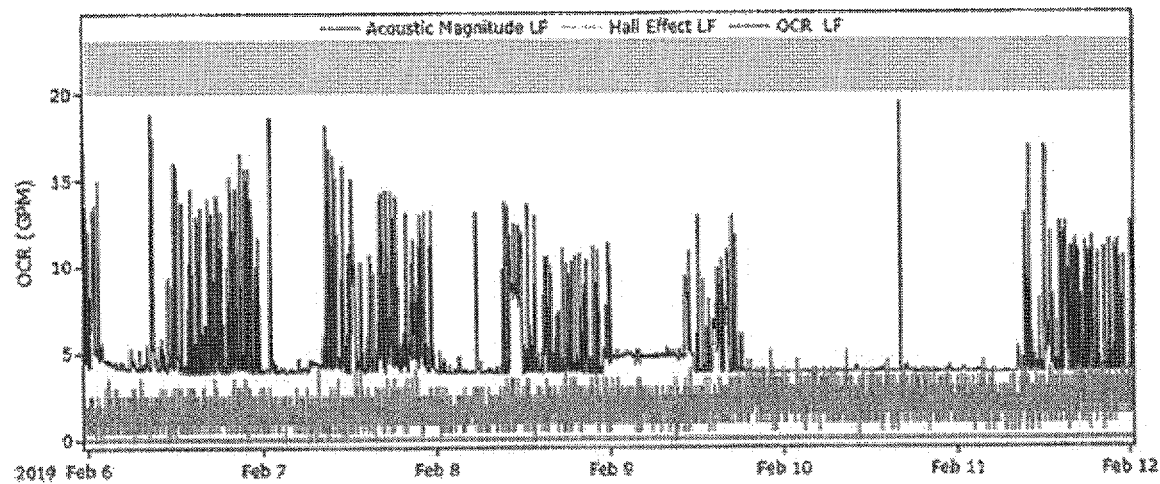
FIGS. 5A-5B are graphs illustrating how the sensor data described herein may be analyzed to detect a measurement failure within a compound water meter.
Figure 5B:
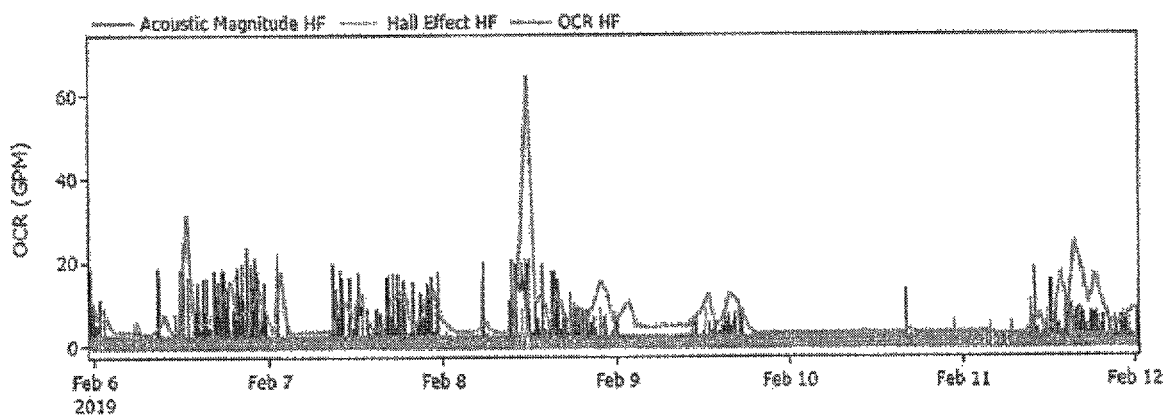
Figure 6A:
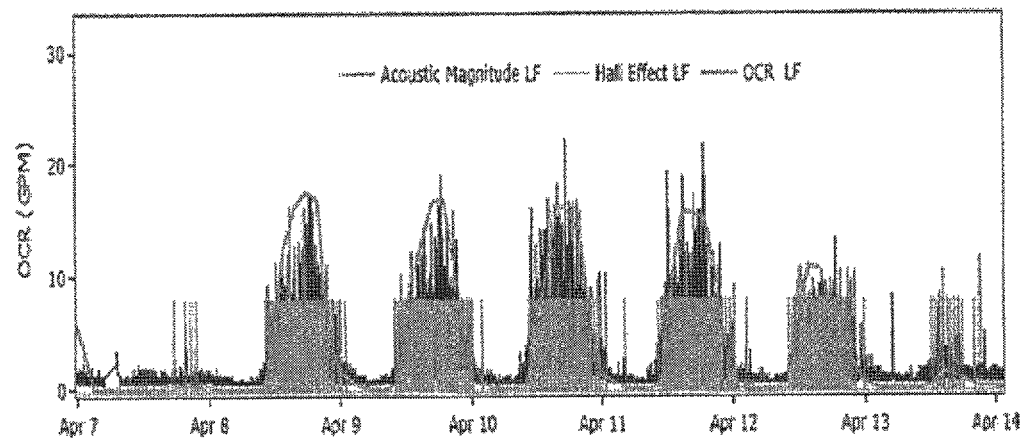
FIGS. 6A-6B are graphs illustrating how the sensor data described herein may be analyzed to detect an incorrectly sized flow meter.
Figure 6B:
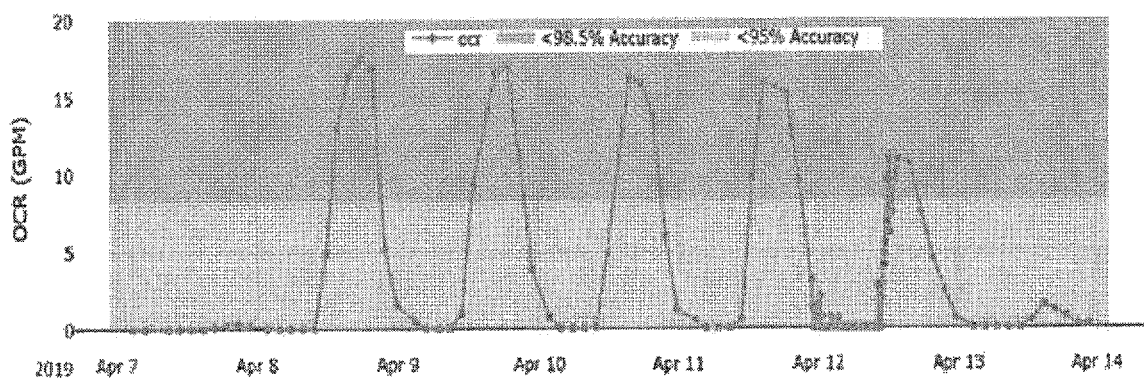

In some embodiments, sensor data from one or more of the sensors within sensor packages 30, 32 may be analyzed by the processing device 42, 60 to monitor water consumption and detect potential problems within the compound water meter. For example, sensor data from the optical sensor, the magnetic sensor and the vibration sensor may be analyzed by processing devices 42, 60 to detect (or rule out) crossover failures, measurement failures, bypass open conditions, and incorrect sizing of flow meters. FIGS. 4-6 provide various examples of how the sensor data obtained from the optical sensor, magnetic sensor and vibration sensor may be analyzed by processing devices 42, 60 to detect crossover failures (FIGS. 4A-4B), measurement failures (FIGS. 5A-5B) and incorrect sizing of flow meters (FIGS. 6A-6B). Other failures or problems may also be detected using the sensor data described herein.

Figure 4C:
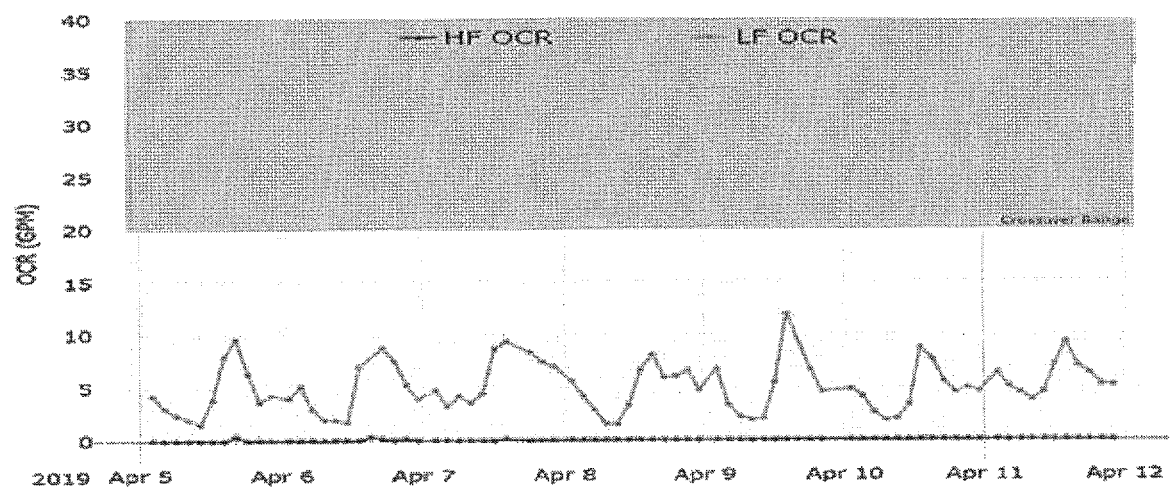

A first set of graphs is provided in FIGS. 4A-4C to illustrate how the sensor data described herein may be analyzed to detect a crossover failure within a compound water meter. In FIGS. 4A-4C, sensor data obtained from sensor packages (e.g., sensor packages 30, 32) coupled to a low flow meter (e.g., low flow meter 24) and a high flow meter (e.g., high flow meter 26) of a compound water meter (e.g., compound water meter 10) over a period of 6-7 days is plotted, compared or analyzed together. The graph shown in FIG. 4A illustrates the sensor data obtained from the optical sensor (orange), magnetic sensor (blue) and vibration sensor (purple) coupled to the low flow meter. The graph shown in FIG. 4B illustrates the sensor data obtained from the optical sensor (orange), magnetic sensor (blue) and vibration sensor (purple) coupled to the high flow meter. The sensor data corresponding to the low flow meter (shown in FIG. 4A) correlates during the presence of flow events. However, the sensor data corresponding to the high flow meter (shown in FIG. 4B) does not correlate during the presence of flow events. This discrepancy indicates the presence of a problem within the compound water meter.

The graph shown in FIG. 4C plots the sensor data (e.g., flow rate, specified in GPM) obtained from the optical sensor (orange) coupled to the low flow meter and the optical sensor (red) coupled to the high flow meter during the same time period. As shown in FIG. 4C, the low flow meter registered flow rates between approximately 1 GPM and 14 GPM (orange) during the time period. Although the flow rates registered by the low flow meter are significantly less than the crossover range (20-40 GPM) specified by the manufacturer, a non-zero flow rate (e.g., 0.2-0.4 GPM, as shown in FIG. 4B) was at times registered by the high flow meter. This indicates a potential crossover failure, such as may occur when a valve within the compound water meter allows a portion of the fluid flow to be diverted through the high flow meter before the flow rate through the low flow meter reaches the crossover range.

A second set of graphs is provided in FIGS. 5A-5B to illustrate how the sensor data described herein may be analyzed to detect a measurement failure within a compound water meter. In FIGS. 5A-5B, sensor data obtained from sensor packages (e.g., sensor packages 30, 32) coupled to a low flow meter (e.g., low flow meter 24) and a high flow meter (e.g., high flow meter 26) of a compound water meter (e.g., compound water meter 10) over a period of 6 days is plotted, compared or analyzed together. The graph shown in FIG. 5A illustrates the sensor data obtained from an optical sensor (orange), magnetic sensor (blue) and vibration sensor (purple) coupled to the low flow meter. The graph shown in FIG. 5B illustrates the sensor data obtained from an optical sensor (orange), magnetic sensor (blue) and vibration sensor (purple) coupled to the high flow meter. Although the sensor data corresponding to the high flow meter (shown in FIG. 5B) correlates during the presence of flow events, the sensor data corresponding to the low flow meter (shown in FIG. 5A) indicates the presence of a problem within the compound water meter. While the magnetic sensor data (blue) and vibration sensor data (purple) shown in FIG. 5A correlate during the presence of flow events, the optical sensor data (orange) shown in FIG. 5A does not correlate with the magnetic sensor data and the vibration sensor data. This indicates a potential measurement failure within the low flow meter, such as a compromised Unitized Measuring Element (e.g., a compromised turbine, nutating disk or floating ball).

A third set of graphs is provided in FIGS. 6A-6B to illustrate how the sensor data described herein may be analyzed to detect an incorrectly sized flow meter. In the graph shown in FIG. 6A, sensor data obtained from an optical sensor (orange), magnetic sensor (blue) and vibration sensor (purple) coupled to a low flow meter over a period of 7 days is plotted, compared or analyzed together. As shown in FIG. 6A, the sensor data obtained from the optical, magnetic and vibration sensors correlates during the presence of flow events, indicating that no apparent mechanical issues exist for this meter during the analysis period. However, and as shown in FIG. 6B, a significant portion (e.g., up to 69%) of the register readings obtained from the optical sensor data occurred below optimal operation (<95% accuracy) during the analysis period. This indicates that the fluid flow is not being accurately measured by the low flow meter, and suggests that replacement with a compound water meter may be recommended.

FIGS. 4-6 provide only a few examples of how the sensor data obtained from the optical sensor, magnetic sensor and vibration sensor provided within sensor packages 30, 32 may be analyzed to monitor water consumption and detect problems within a water meter. In some embodiments, sensor data from sensor packages 30, 32 may be combined with sensor data obtained from one or more additional sensor packages to detect leaks within the compound water meter 10 and/or to detect fraud. For example, water pressure readings obtained by the additional sensor packages 34, 36, and 38 shown in FIG. 1 may be combined with the vibration sensor readings obtained by the sensor packages 30, 32 to aid in the detection of leaks in the bypass, low flow and high flow sections 12, 14, and 16. Additionally, knowing that the bypass section 12 is in operation (i.e., water is flowing through the bypass section) is useful to detect fraud. That is, if sensor package 36 detects water flow/pressure within bypass section 12, it can be surmised that a customer has totally or partially bypassed the flow meters 24, 26 provided in the low flow and high flow sections 14, 16 to obtain free water.

Figure 7:
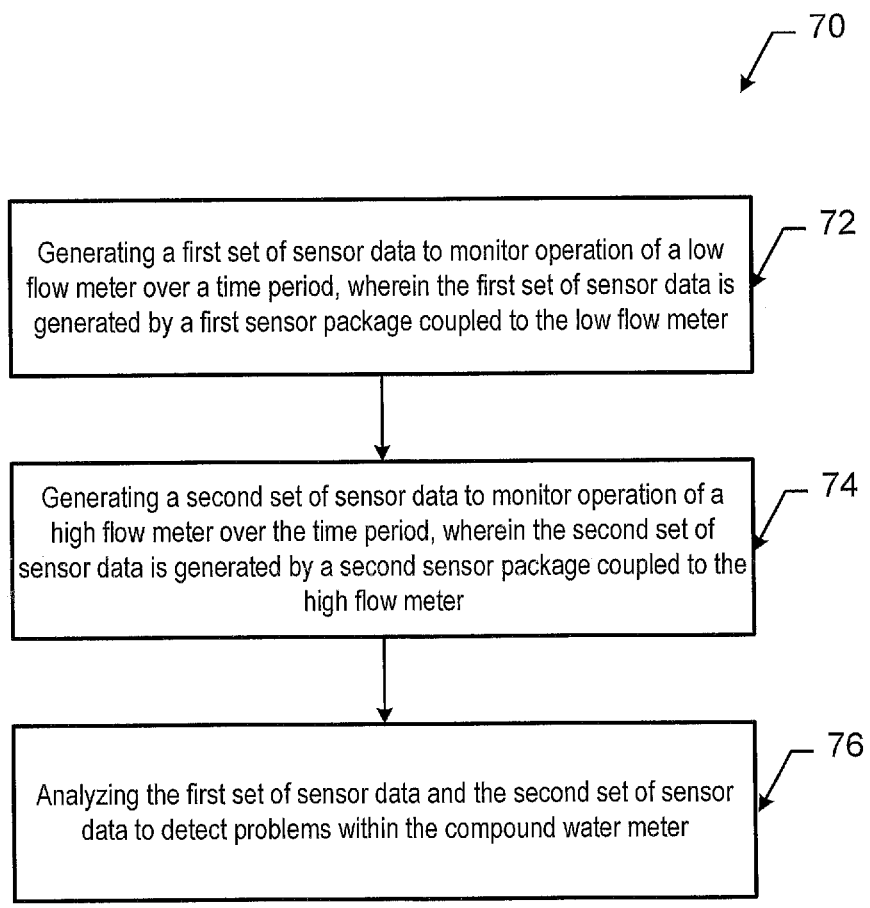
FIG. 7 is a flowchart diagram illustrating one embodiment of a method to monitor water consumption and detect problems within a compound water meter.

FIG. 7 illustrates one embodiment of a method 70 that may be used to detect problems within a compound water meter, such as but not limited to the compound water meters shown and described herein. In general, method 70 may include generating a first set of sensor data to monitor operation of the low flow meter over a time period (in step 72), generating a second set of sensor data to monitor operation of the high flow meter over the time period (in step 74), and analyzing the first set of sensor data and the second set of sensor data to detect problems within the compound water meter (in step 76). The first set of sensor data may be generated by a first sensor package (e.g., sensor package 32) coupled to the low flow meter (e.g., low flow meter 24), and the second set of sensor data may be generated by a second sensor package (e.g., sensor package 30) coupled to the high flow meter (e.g., high flow meter 26), as set forth above.

In some embodiments, the first set of sensor data may be generated (in step 72) by generating, over the time period, a series of images of a meter display provided on the low flow meter, wherein each image captures a cumulative throughput of the fluid flow through the low flow meter at one point in time. Likewise, the second set of sensor data may be generated (in step 74) by generating, over the time period, a series of images of a meter display provided on the high flow meter, wherein each image captures a cumulative throughput of the fluid flow through the high flow meter at one point in the time period.

The first set of sensor data and the second set of sensor data may each be analyzed (in step 76) by extracting the cumulative throughput and/or the flow rate of the fluid flow from each image of the series of images to generate digital readings of the cumulative throughput and/or the flow rate over the time period. If flow rate is not included on the meter display, the digital readings of the cumulative throughput may be further analyzed to determine or calculate flow rate measurements over the time period. In some cases, a register failure may be detected during the analysis step, if the digital readings of the cumulative throughput stay the same or decrease over the time period. In other cases, an incorrectly sized flow meter may be detected during the analysis step, if a specified percentage of the flow rate measurements occur below an optimal flow rate specified by a manufacturer. In yet other cases, a crossover failure may be detected during the analysis step, if: (a) the flow rate measurements pertaining to the fluid flow through the low flow meter over the time period are less than a crossover range specified by a manufacture and (b) one or more of the flow rate measurements pertaining to the fluid flow through the high flow meter over the time period are greater than zero.

In other embodiments, generating the first set of sensor data (in step 72) and generating the second set of sensor data (in step 74) may each include: (a) generating, over the time period, a series of images of a meter display provided on the low flow meter or the high flow meter, wherein each image captures a cumulative throughput of the fluid flow through the low flow meter or the high flow meter at one point in time; (b) generating, over the time period, a rotation count of a turbine included within the low flow meter or the high flow meter; and (c) generating, over the time period, vibration signatures indicative of fluid flow through the low flow meter or the high flow meter.

In such embodiments, the first set of sensor data and the second set of sensor data may each be analyzed (in step 76) by: (a) extracting the cumulative throughput from each image of the series of images to generate digital readings of the cumulative throughput over the time period; (b) using the digital readings of the cumulative throughput to generate flow rate measurements over the time period; (c) comparing the flow rate measurements, the rotation count and the vibration signatures generated over the time period; and (d) detecting a measurement failure if the flow rate measurements or the rotation count do not correlate with the vibration signatures.

In some embodiments, the method 70 may also include generating a third set of sensor data to measure water pressure within the compound water meter. In one example, the third set of sensor data may be generated by an additional sensor package, which is arranged within a test port located at or near an input to the compound water meter to measure the incoming water pressure. In another example, the third set of sensor data may be generated by one or more additional sensor packages, which are arranged within the low flow section, the high flow section and/or the bypass section to measure the water pressure within those sections. In such embodiments, the method may further include combining the third set of sensor data with the first set of sensor data or the second set of sensor data to detect leaks within the compound water meter and/or to detect fraud.

Figure 8:
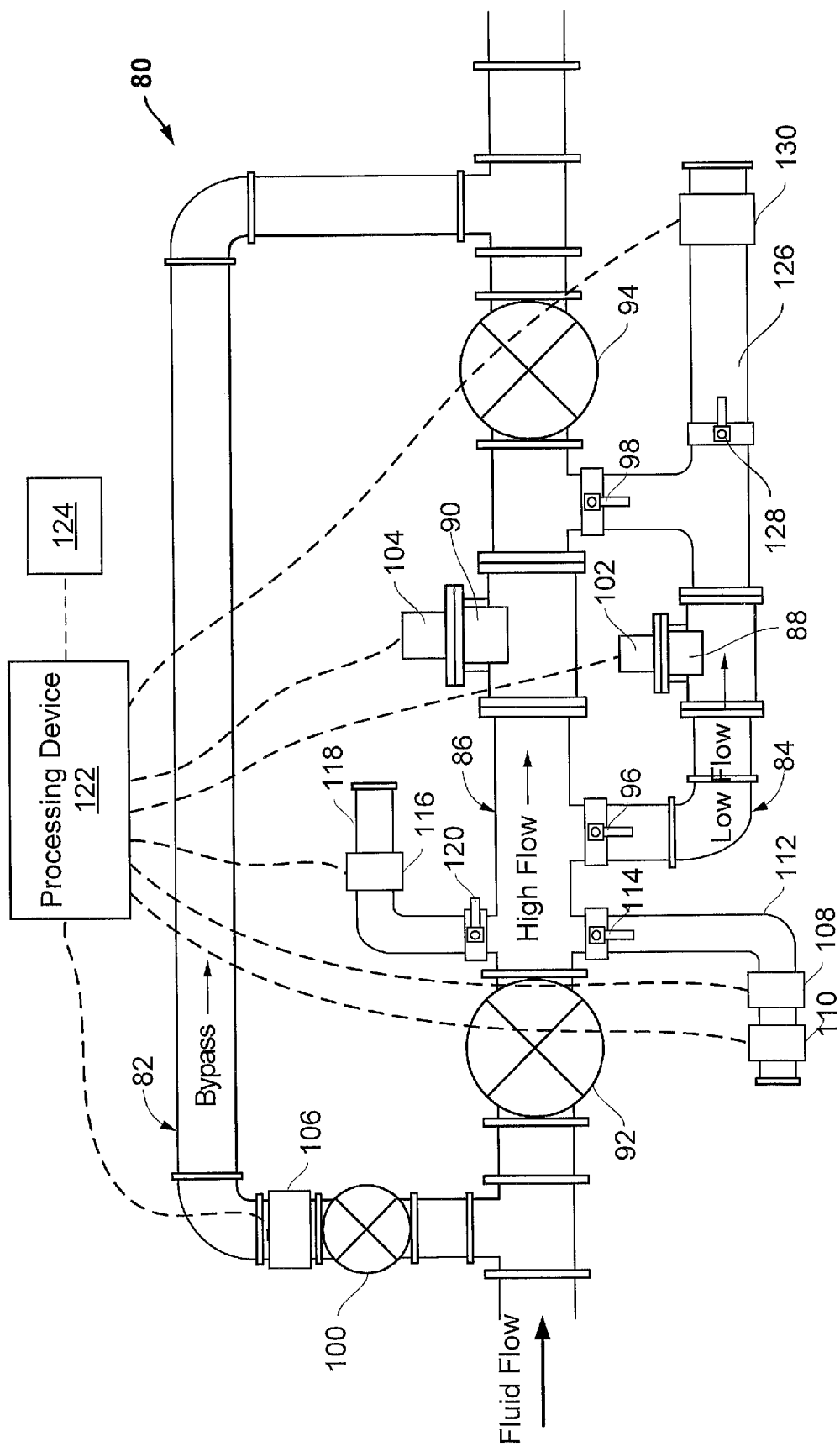
FIG. 8 is a functional diagram illustrating yet another embodiment of a compound water meter in accordance with the present techniques.

FIG. 8 illustrates yet another embodiment of a compound water meter 80 in accordance with the present techniques. Similar to the embodiments disclosed above, compound water meter 80 generally includes a bypass section 82, a low flow section 84 and a high flow section 86. A low flow meter 88 and a high flow meter 90 are provided within the low flow section 84 and the high flow section 86, respectively, for monitoring the fluid flow through those sections. Flow meters 88 and 90 may be generally implemented as described above. In one embodiment, the flow meters 88 and 90 may be implemented as turbine flow meters. An inlet gate valve 92 is provided on the inlet side, and an outlet gate valve 94 is provided on the outlet side, of the high flow section 86. In addition, an inlet ball valve 96 is provided on the inlet side, and an outlet ball valve 98 is provided on the outlet side, of the low flow section 88.

Like the previously described embodiments, water typically flows from the utility pipe system through the inlet gate valve 92 into either the low flow section 84 or the high flow section 86 to the commercial user, depending on the incoming water pressure. As water flows through the low flow section 84 and/or the high flow section 86, flow meters 88, 90 record various parameters of the fluid flow, such as for example, cumulative throughput (e.g., flow volume units), rate of throughput (e.g., flow rate), etc. For maintenance purposes, bypass valve 100 is provided within the bypass section 82 of the compound water meter 80. When the bypass valve 100 is opened, water flow is diverted through the bypass section 82, which enables water to bypass the low flow and high flow meters 88, 90 and flow directly to the commercial user.

Sensor packages 102, 104 are included within, or coupled to, flow meters 88 and 90 to record various parameters concerning operation of the flow meters 88, 90. Like the sensor packages 30, 32 shown in FIG. 1 and described above, the sensor packages 102, 104 provided within compound water meter 80 each preferably include an optical sensor, a magnetic sensor, and a vibration sensor. As described above, the optical sensor (e.g., one or more cameras) reads the register on the meter display to obtain a digital reading of one or more measurements and/or indicators provided thereon, such as but not limited to, the cumulative throughput and/or flow rate of the fluid flow through flow meters 88 and 90. The magnetic sensor (e.g., a hall effect sensor) directly measures movement of the turbine, which provides an indication of turbine operation and an indirect measurement of the cumulative throughput of fluid flow. The vibration sensor (e.g., an acoustic sensor or MEMS sensor) senses vibrations in the flow meters 88, 90, which may result from water movement or fluid flow through the flow meters.

Additional sensors may also be included within compound water meter 80 to determine water pressure, temperature, and water quality within the compound water meter 80, as well as to record other environmental data, such as but not limited to, the presence of water outside of compound water meter 80. For example, a pressure sensor 106 may be coupled to (or arranged within) the bypass section 82 to detect fraud by detecting water flow/pressure through the bypass section. Although not shown in FIG. 8, additional pressure sensors may be coupled to (or arranged within) the low flow section 84, high flow section 86 or elsewhere within the compound water meter 80 to measure the water pressure in the respective section and/or detect leaks.

A variety of sensors may also be coupled to (or arranged within) one or more test ports provided within the compound water meter 80. In the embodiment shown in FIG. 8, water pressure sensor 108, temperature sensor 110 and water quality sensor 116 are coupled to various test ports of the compound water meter 80. Water pressure sensor 108 and temperature sensor 110 are coupled to a first test port 112, which is arranged near an inlet side of the compound water meter 80 and controlled by a first inlet ball valve 114. Water quality sensor 116 is coupled to a second test port 118, which is coupled near the inlet side of the compound water meter 80 and controlled by a second inlet ball valve 120. The water pressure sensor 108 measures the water pressure of the incoming fluid flow. The temperature sensor 110 measures the temperature of the incoming fluid flow, or an ambient temperature surrounding compound water meter 80. The water quality sensor 116 (e.g., a chemical sensor) measures various chemical properties of the incoming fluid flow, such as acidity (pH), lead, or quantity of an additive.

Similar to the previously described embodiments, the sensor data obtained from the sensor packages 102, 104 and the additional sensors 106, 108, 110 and 116 is preferably time stamped, so that the sensor data can be analyzed to monitor water consumption and detect possible problems with the compound water meter 80 or the water flowing therethrough. The sensor data may be available in real time for real time data analysis, or may be recorded and analyzed offline at a later date.

Like the previously described embodiments, the sensor data obtained from sensor packages 102, 104 and the additional sensors 106, 108, 110 and 116 may be analyzed by a processing device. In the embodiment shown in FIG. 8, processing device 122 is communicatively coupled to sensor packages 102, 104 and additional sensors 106, 108, 110 and 116 for receiving the sensor data obtained thereby. The sensor data received by processing device 122 may be analyzed in real-time, or may be stored and analyzed later. Processing device 122 may execute program instructions to analyze the sensor data. As noted above, the sensor data received from sensor packages 102, 104 and pressure sensor 106 may be analyzed to monitor water consumption and detect potential problems within the compound water meter, such as register failures, measurement failures, crossover failures, bypass open conditions, and incorrect sizing of flow meters.

In addition, the sensor data received from water pressure sensor 108, temperature sensor 110 and water quality sensor 116 may be analyzed to detect pressure, temperature and/or water quality issues. For example, pressure readings from water pressure sensor 108 may be used to detect pressure issues within the pipe system, such as water pressures over an upper threshold and under a lower threshold, which may lead to underreporting of fluid flow. In addition, ambient and/or water temperature readings from temperature sensor 110 may be used to detect temperature issues, which may cause water leaks and/or pipe bursts that may lead to underreporting of fluid flow. Readings from water quality sensor 116 may be used to detect various water quality issues, such as but not limited to, pH imbalances and/or other toxicities caused by corrosion in the pipes, minerals in the water and/or other public health concerns. In some cases, readings from the water quality sensor 116 may also be used to determine if the water flowing through the compound water meter 80 is contaminated or contains an incorrect imbalance of other chemical properties.

In the embodiment shown in FIG. 8, a leak detection sensor 124 is indirectly coupled to the compound water meter 80 for detecting water presence outside of the compound water meter. In one example implementation, leak detection sensor 124 may be provided within the meter pit housing the compound water meter 80. By arranging the leak detection sensor 124 outside of the meter, the water detection readings (i.e., sensor data) provided by the leak detection sensor 124 may be used to detect pipe leaks that cause fluid flow outside of the ecosystem of the compound water meter 80. Like sensor packages 102, 104 and the additional sensors 106, 108, 110 and 116, the sensor data obtained from the leak detection sensor 124 may be time-stamped, optionally recorded and analyzed by processing device 122 to detect leaks outside of the compound water meter.

In some embodiments, a power source or power generator may be provided and used to supply electrical power to one or more components of the compound water meter 80. For example, a solar panel and rechargeable battery may be used to supply electrical power to one or more of the sensor packages 102, 104, the additional sensors 106, 108, 110, 116, 124 and/or the processing device 122. In some embodiments, a hydro-electric generator 130 may be provided within the compound water meter 80 and used to convert the energy of flowing water into electric energy, which is supplied to one or more components of the compound water meter 80. In the embodiment shown in FIG. 8, hydro-electric generator 130 is coupled to a third test port 126, which is coupled to the low flow section 84 and controlled by a third inlet ball valve 128. However, the hydro-electric generator 130 is not strictly limited to such placement and may be alternatively arranged in other embodiments. For example, the hydro-electric generator 130 may be alternatively coupled to the first test port 112, the second test port 118 or within another test port not specifically shown herein.

What is claimed is:

1. A system, comprising:
   a compound water meter, comprising:
   a pipe system that includes a low flow section, a high flow section and a bypass section;
   a first valve located at a junction between the low flow section and the high flow section, wherein the first valve is pressure operated to direct fluid flow into the low flow section and/or the high flow section based on a pressure at the first valve;
   a low flow meter for monitoring the fluid flow through the low flow section;
   a high flow meter for monitoring the fluid flow through the high flow section; and
   a second valve, which redirects the fluid flow through the bypass section and bypasses the low flow meter and the high flow meter when the first valve is closed and the second valve is opened;
   a plurality of sensors coupled at various points within the compound water meter, wherein the plurality of sensors include:
   a first sensor package coupled to the low flow meter to monitor operation of the low flow meter; and
   a second sensor package coupled to the high flow meter to monitor operation of the high flow meter;
   a third sensor package coupled to the bypass section to monitor the fluid flow, a water pressure of the fluid flow, or a combination of the fluid flow and the water pressure through the bypass section when the second value is opened;
   a processing device coupled to receive sensor data from the plurality of sensors and configured to execute program instructions to analyze the sensor data to detect problems within the compound water meter, wherein the processing device is configured to execute the program instructions to analyze the sensor data received from one or more sensors included within the first sensor package, the second sensor package and the third sensor package to detect:
   (a) a crossover failure within the compound water meter, wherein the crossover failure occurs when the first valve fails to redirect the fluid flow from the low flow section to the high flow section at a specified fluid flow rate; and
   (b) a bypass open condition within the compound water meter, wherein the bypass open condition occurs when the first valve is closed and the second valve is opened to redirect the fluid flow through the bypass section and bypass the low flow meter and the high flow meter.

2. The system as recited in claim 1, wherein the first sensor package and the second sensor package each comprise:
   an optical sensor coupled to generate an image of at least a portion of a meter display provided on the low flow meter or the high flow meter;
   a magnetic sensor coupled to generate a rotation count of a turbine included within the low flow meter or the high flow meter; and
   a vibration sensor coupled to generate vibration signatures indicative of fluid flow through the low flow meter or the high flow meter;
   wherein the sensor data received by the processing device comprises the image generated by the optical sensor, the rotation count generated by the magnetic sensor and the vibration signatures generated by the vibration sensor.

3. The system as recited in claim 1, wherein the processing device executes the program instructions to analyze the sensor data received from one or more of the sensors included within the first sensor package and the second sensor package to detect a register failure, a measurement failure and/or an incorrect flow meter size.

4. The system as recited in claim 1, wherein the plurality of sensors further include at least one water pressure sensor coupled to measure water pressure within the compound water meter, and wherein the sensor data received by the processing device further comprises the water pressure measured by the at least one water pressure sensor.

5. The system as recited in claim 4, wherein the processing device executes the program instructions to combine the sensor data received from the at least one water pressure sensor with the sensor data received from the first sensor package or the second sensor package to detect leaks within the compound water meter and/or to detect fraud.

6. The system as recited in claim 1, wherein the plurality of sensors further include a temperature sensor coupled to measure a temperature of the fluid flow, or an ambient temperature surrounding the compound water meter, and wherein the sensor data received by the processing device further comprises the temperature measured by the temperature sensor.

7. The system as recited in claim 1, wherein the plurality of sensors further include a water quality sensor, which is coupled to measure one or more chemical properties of the fluid flow within the compound water meter, and wherein the sensor data received by the processing device further comprises the chemical properties measured by the water quality sensor.

8. The system as recited in claim 1, wherein the plurality of sensors further include a leak detection sensor, which is indirectly coupled to the compound water meter for detecting water presence outside of the compound water meter, and wherein the sensor data received by the processing device further comprises water detection readings obtained by the leak detection sensor.

9. The system as recited in claim 1, further comprising a power source or a power generator, which is configured to supply electrical power to one or more components of the system.

10. The system as recited in claim 1, further comprising a hydro-electric generator, which is coupled to the compound water meter and configured to convert energy of the fluid flow through the compound water meter into electric energy, which is supplied to the processing device and/or one or more of the plurality of sensors.

11. A method to detect problems within a compound water meter comprising a low flow section, a high flow section and a bypass section, a low flow meter for monitoring fluid flow through the low flow section, and a high flow meter for monitoring fluid flow through the high flow section, the method comprising:

generating a first set of sensor data to monitor operation of the low flow meter over a time period, wherein the first set of sensor data is generated by a first sensor package coupled to the low flow meter;

generating a second set of sensor data to monitor operation of the high flow meter over the time period, wherein the second set of sensor data is generated by a second sensor package coupled to the high flow meter;

generating a third set of sensor data to measure fluid flow or a water pressure of the fluid flow within the bypass section, wherein the third set of sensor data is generated by a third sensor package coupled to the bypass section; and analyzing one or more of the first set of sensor data, the second set of sensor data and the third set of sensor data to detect problems within the compound water meter;

wherein said analyzing comprises analyzing one or more of the first set of sensor data, the second set of sensor data and the third set of sensor data to detect:

(a) a crossover failure within the compound water meter, wherein the crossover failure occurs when a first valve, which is located at a junction between the low flow section and the high flow section for directing the fluid flow into the low flow section and/or the high flow section based on a pressure at the first valve, fails to redirect the fluid flow from the low flow section to the high flow section within a specified crossover range; and (b) a bypass open condition within the compound water meter, wherein the bypass open condition occurs when the first valve is closed and a second valve coupled to the bypass section is opened to redirect the fluid flow through the bypass section and bypass the low flow meter and the high flow meter.

12. The method as recited in claim 11, wherein generating the first set of sensor data comprises:

generating, over the time period, a first series of images of a meter display provided on the low flow meter, wherein each image of the first series of images captures a cumulative throughput of the fluid flow through the low flow meter at one point in time.

13. The method as recited in claim 12, wherein generating the second set of sensor data comprises:

generating, over the time period, a second series of images of a meter display provided on the high flow meter, wherein each image of the second series of images captures a cumulative throughput of the fluid flow through the high flow meter at one point in the time period.

14. The method as recited in claim 13, wherein analyzing the first set of sensor data and analyzing the second set of sensor data each comprise:

extracting the cumulative throughput of the fluid flow from each image of the first series of images to generate digital readings of the cumulative throughput of the fluid flow through the low flow meter over the time period; and using the digital readings of the cumulative throughput of the fluid flow through the low flow meter to generate flow rate measurements pertaining to the fluid flow through the low flow meter over the time period extracting the cumulative throughput of the fluid flow from each image of the second series of images to generate digital readings of the cumulative throughput of the fluid flow through the high flow meter over the time period; and using the digital readings of the cumulative throughput of the fluid flow through the high flow meter to generate flow rate measurements pertaining to the fluid flow through the high flow meter over the time period.

15. The method as recited in claim 14, wherein analyzing the first set of sensor data and analyzing the second set of sensor data each further comprise:

determining that the digital readings of the cumulative throughput of the fluid flow through the low flow meter or the high flow meter have stayed the same or decreased over the time period; and detecting a register failure within the low flow meter or the high flow meter in response to said determining.

16. The method as recited in claim 14, wherein analyzing the first set of sensor data and analyzing the second set of sensor data each further comprise:

determining that a specified percentage of the flow rate measurements pertaining to the fluid flow through the low flow meter or the high flow meter have occurred below an optimal flow rate specified by a manufacturer; and detecting that the low flow meter or the high flow meter is incorrectly sized in response to said determining.

17. The method as recited in claim 14, wherein analyzing the first set of sensor data and analyzing the second set of sensor data each further comprise:

determining that: (a) the flow rate measurements pertaining to the fluid flow through the low flow meter over the time period are less than the specified crossover range, and (b) one or more of the flow rate measurements pertaining to the fluid flow through the high flow meter over the time period are greater than zero; and detecting the crossover failure in response to said determining.

18. The method as recited in claim 11, wherein generating the first set of sensor data and generating the second set of sensor data each comprise:

generating, over the time period, a series of images of a meter display provided on the low flow meter or the high flow meter, wherein each image captures a cumulative throughput of the fluid flow through the low flow meter or the high flow meter at one point in time;

generating, over the time period, a rotation count of a turbine included within the low flow meter or the high flow meter; and generating, over the time period, vibration signatures indicative of fluid flow through the low flow meter or the high flow meter.

19. The method as recited in claim 18, wherein analyzing the first set of sensor data and analyzing the second set of sensor data each comprise:

extracting the cumulative throughput from each image of the series of images to generate digital readings of the cumulative throughput over the time period;

using the digital readings of the cumulative throughput to generate flow rate measurements over the time period;

comparing the flow rate measurements, the rotation count and the vibration signatures generated over the time period;

determining that the flow rate measurements or the rotation count do not correlate with the vibration signatures; and detecting a measurement failure in response to said determining.

20. The method as recited in claim 11, further comprising analyzing the third set of sensor data to detect: (a) the bypass open condition or (b) a bypass closed condition, which occurs when the second valve is closed.

21. The method as recited in claim 11, further comprising combining the third set of sensor data with the first set of sensor data or the second set of sensor data to detect: (a) the bypass open condition or (b) a bypass closed condition, which occurs when the second valve is closed.

* * * * *